(12) United States Patent
Probst et al.

(10) Patent No.: US 8,472,177 B2
(45) Date of Patent: Jun. 25, 2013

(54) TABLET COMPUTER CASE AND ASSOCIATED METHODS

(75) Inventors: Brian Hullinger Probst, Orem, UT (US); David W. Osborne, Cedar Hills, UT (US)

(73) Assignee: CruxCase, LLC, Orem, UT (US)

(*) Notice: Subject to any disclaimer, the term of this patent is extended or adjusted under 35 U.S.C. 154(b) by 0 days.

(21) Appl. No.: 13/283,148

(22) Filed: Oct. 27, 2011

(65) Prior Publication Data

US 2012/0106062 A1 May 3, 2012

Related U.S. Application Data

(63) Continuation of application No. 13/097,043, filed on Apr. 28, 2011, and a continuation-in-part of application No. 13/016,830, filed on Jan. 28, 2011.

(60) Provisional application No. 61/328,984, filed on Apr. 28, 2010, provisional application No. 61/422,621, filed on Dec. 13, 2010, provisional application No. 61/298,974, filed on Jan. 28, 2010.

(51) Int. Cl.
*H05K 5/00* (2006.01)
*H05K 7/00* (2006.01)
*G06F 3/02* (2006.01)
*H04M 1/00* (2006.01)

(52) U.S. Cl.
USPC ............ 361/679.27; 361/679.55; 361/679.56; 361/679.28; 361/679.29; 361/679.3; 345/168; 345/169; 455/575.3

(58) Field of Classification Search
USPC ............ 361/679.01, 679.02, 679.08, 679.09, 361/679.21–679.39, 679.3, 679.55–679.59, 361/679.4, 679.41–679.45; 345/156, 157, 345/168, 169, 184; 455/575.1, 575.3, 575.4, 455/575.8; 369/282, 291, 253, 44.16, 75.5
See application file for complete search history.

(56) References Cited

U.S. PATENT DOCUMENTS

| | | |
|---|---|---|
| 676,449 A | 6/1901 | Schwarz |
| 4,259,568 A | 3/1981 | Dynesen |
| 5,375,076 A | 12/1994 | Goodrich et al. |
| 5,383,138 A | 1/1995 | Motoyama et al. |
| 5,594,619 A | 1/1997 | Miyagawa et al. |
| 5,666,694 A | 9/1997 | Slow et al. |
| 5,737,183 A | 4/1998 | Kobayashi et al. |
| 5,847,698 A | 12/1998 | Reavey et al. |
| 5,987,704 A | 11/1999 | Tang |

(Continued)

OTHER PUBLICATIONS

U.S. Appl. No. 29/405,037, filed Oct. 27, 2011; Brian Probst.

(Continued)

*Primary Examiner* — Zachary M Pape
*Assistant Examiner* — Jerry Wu
(74) *Attorney, Agent, or Firm* — Thorpe North & Western LLP

(57) ABSTRACT

Tablet computer cases and associated methods are disclosed and described. In one embodiment, a tablet computer case may include a first panel configured to releasably engage and hold a tablet computer of a predetermined size and shape, a second panel having a keyboard a hinge rotatably attaching the two panels, and a communication connector that allows the keyboard to communicate with the tablet computer.

32 Claims, 9 Drawing Sheets

U.S. PATENT DOCUMENTS

| | | |
|---|---|---|
| 6,219,230 B1 | 4/2001 | Cho |
| 6,253,419 B1 | 7/2001 | Lu |
| 6,304,433 B2 | 10/2001 | O'Neal et al. |
| 6,493,216 B1 | 12/2002 | Lin |
| 6,498,718 B1 | 12/2002 | Kim et al. |
| 6,771,494 B2 | 8/2004 | Shimano |
| 7,042,712 B2 | 5/2006 | Ghost et al. |
| 7,318,521 B2 | 1/2008 | Lau |
| 7,484,271 B2 | 2/2009 | Oshima |
| 7,502,225 B2 | 3/2009 | Solomon et al. |
| 7,540,675 B2 | 6/2009 | Liu |
| D611,045 S | 3/2010 | Andre et al. |
| 7,730,587 B2 | 6/2010 | Chang et al. |
| D620,001 S | 7/2010 | Reed et al. |
| D637,596 S | 5/2011 | Akana et al. |
| D652,831 S | 1/2012 | Lee et al. |
| 8,139,357 B2 | 3/2012 | Trang |
| D659,139 S | 5/2012 | Gengler |
| 2001/0040559 A1* | 11/2001 | Bullister .................. 345/168 |
| 2002/0159226 A1* | 10/2002 | Huang et al. ................. 361/680 |
| 2003/0112585 A1 | 6/2003 | Silvester |
| 2003/0112590 A1* | 6/2003 | Shimano et al. ............. 361/683 |
| 2003/0198008 A1 | 10/2003 | Leapman et al. |
| 2004/0114315 A1 | 6/2004 | Anlauff |
| 2004/0159762 A1 | 8/2004 | Ghosh |
| 2004/0160735 A1 | 8/2004 | Ghosh et al. |
| 2004/0169995 A1 | 9/2004 | Ghosh et al. |
| 2004/0195305 A1 | 10/2004 | Dotson |
| 2004/0212954 A1 | 10/2004 | Ulla et al. |
| 2004/0232302 A1 | 11/2004 | Huang et al. |
| 2005/0052831 A1 | 3/2005 | Chen |
| 2005/0122671 A1 | 6/2005 | Homer |
| 2005/0155182 A1 | 7/2005 | Han et al. |
| 2005/0168925 A1* | 8/2005 | Fang et al. .................. 361/683 |
| 2005/0200608 A1 | 9/2005 | Ulla et al. |
| 2005/0236869 A1 | 10/2005 | Ka et al. |
| 2006/0007645 A1* | 1/2006 | Chen et al. .................. 361/681 |
| 2006/0044288 A1 | 3/2006 | Nakamura et al. |
| 2006/0256511 A1 | 11/2006 | Ma |
| 2006/0264243 A1 | 11/2006 | Aarras |
| 2007/0091553 A1 | 4/2007 | Chang |
| 2007/0097087 A1 | 5/2007 | Homer et al. |
| 2007/0203963 A1 | 8/2007 | Chen et al. |
| 2008/0084396 A1 | 4/2008 | Pen |
| 2008/0225471 A1 | 9/2008 | Takizawa |
| 2009/0000062 A1 | 1/2009 | Yamanami |
| 2009/0056073 A1 | 3/2009 | Lin |
| 2010/0172081 A1 | 7/2010 | Tian et al. |
| 2010/0195279 A1 | 8/2010 | Michael |
| 2011/0199727 A1 | 8/2011 | Probst |
| 2011/0222238 A1 | 9/2011 | Staats et al. |
| 2011/0267757 A1 | 11/2011 | Probst |
| 2012/0106060 A1 | 5/2012 | Probst |
| 2012/0106061 A1 | 5/2012 | Probst |
| 2012/0106062 A1 | 5/2012 | Probst |
| 2012/0106078 A1 | 5/2012 | Probst |

OTHER PUBLICATIONS

U.S. Appl. No. 29/405,127, filed Oct. 28, 2011; Brian Probst.
U.S. Appl. No. 13/283,357, filed Oct. 27, 2011; Brian Probst.
U.S. Appl. No. 13/283,005, filed Oct. 27, 2011; Brian Probst.
U.S. Appl. No. 13/283,067, filed Oct. 27, 2011; Brian Probst.
U.S. Appl. No. 13/283,112, filed Oct. 27, 2011; Brian Probst.
PCT Application PCT/US2011/034405; filing date Apr. 28, 2011; Brian Probst; International Search Report mailed Dec. 20, 2011.
U.S. Appl. No. 13/283,357, filed Oct. 27, 2011; Brian Hullinger Probst; office action dated Aug. 30, 2012.
U.S. Appl. No. 13/283,005, filed Oct. 27, 2011; Brian Hullinger Probst; office action dated Aug. 31, 2012.
U.S. Appl. No. 13/097,043, filed Apr. 28, 2011; Brian Hullinger Probst; office action dated Aug. 31, 2012.
U.S. Appl. No. 13/283,112, filed Oct. 27, 2011; Brian Hullinger Probst; office action dated Sep. 4, 2012.
U.S. Appl. No. 13/283,067, filed Oct. 27, 2011; Brian Hullinger Probst; office action dated Sep. 4, 2012.
U.S. Appl. No. 29/405,127, filed Oct. 28, 2011; Brian Hullinger Probst; office action dated Sep. 18, 2012.
U.S. Appl. No. 13/016,830, filed Jan. 28, 2011; Brian Probst; office action dated Sep. 4, 2012.
U.S. Appl. No. 29/405,037, filed Oct. 27, 2011; Brian Hullinger Probst; office action dated Nov. 15, 2012.
Stern, Joanna; Lenovo IdeaPad U1 Hybrid: laptop by day, unhinged tablet by night; Jan. 4, 2010; 1 page.
Stein; "Lenovo meshes tablet and Netbook in one device with IdeaPad U1 Hybrid Notebook"; Jan. 4, 2010; 3 pages.
Stern; "Lenovo IdeaPad U1 Hybrid hands-on and impressions"; Jan. 5, 2010; 4 pages.
Sutter; "What is a tablet, anyway?"; Jan. 9, 2010; 3 pages.
Herrman; "Always Innovating Half-Netbook, Half-Tablet Ships in July, Still $300"; Jun. 25, 2009; 2 pages.
Miller; "The Dawn of the Tablet PC: CES 2010 Roundup"; Jan. 7, 2010 ; 2 pages.
U.S. Appl. No. 13/016,830, filed Jan. 28, 2011; Brian Probst; Office Action issued Feb. 01, 2013.
U.S. Appl. No. 13/097,043, filed Apr. 28, 2011; Brian Hullinger Probst; Notice of Allowance issued Apr. 8, 2013.
U.S. Appl. No. 13/283,357, filed Oct. 27, 2011; Brian Hullinger Probst; Notice of Allowance issued Apr. 3, 2013.
U.S. Appl. No. 13/283,005, filed Oct. 27, 2011; Brian Hullinger Probst; Notice of Allowance issued Mar. 26, 2013.
U.S. Appl. No. 13/283,067, filed Oct. 27, 2011; Brian Hullinger Probst; Notice of Allowance issued Mar. 22, 2013.
U.S. Appl. No. 13/283,112, filed Oct. 27, 2011; Brian Hullinger Probst; Notice of Allowance issued Mar. 29, 2013.

* cited by examiner

TABLET COMPUTER CASE AND ASSOCIATED METHODS

PRIORITY DATA

This application is a continuation of U.S. patent application Ser. No. 13/097,043, filed on Apr. 28, 2011, which claims the benefit of U.S. Provisional Patent Application Ser. Nos. 61/328,984 and 61/422,621 filed on Apr. 28, 2010 and Dec. 13, 2010 respectively, and is also a continuation-in-part of U.S. patent application Ser. No. 13/016,830, filed on Jan. 28, 2011, which claims the benefit of U.S. Provisional Application Ser. No. 61/298,974 filed on Jan. 28, 2010, each of which is incorporated herein by reference.

FIELD OF THE INVENTION

The present invention relates to cases for tablet computing devices and related methods. Accordingly, the present invention involves the fields of electronics, material science, and mechanical engineering.

BACKGROUND OF THE INVENTION

Tablet computers such as Personal Digital Assistants (PDA), cellular phones, and the computing device recently released by Apple Corporation under the trade name IPAD® have become increasingly popular. The simple and slim form factor of such devices is one reason. Another reason is that many of such devices come with a touch sensitive screen, or "touch screen" where user input and computing control are engaged by simply touching the digital display screen. One pioneering example is the cellular phone marketed by Apple under the trade name IPHONE®. This phone has a touch screen that allows navigation of computing function, such as internet navigation, program engagement, and communication (i.e. placement of calls, generation of e-mail, and creation of text messaging) all by directly touching the screen or visual interface.

Direct screen touch navigation has been met with tremendous success in the marketplace because of the ease of navigation and the absence of navigation hardware that is often bulky, difficult or unnatural to use, and often fragile. While direct screen touch navigation overcomes these issues, it is not ideal for some functions such as text input. Particularly, most tablet devices do not allow the user to input text with a full sized or nearly full sized QWERTY keyboard or other format keyboard for full typing capacity with both hands. Neither would the touch sensitive display provide sufficient responsiveness to accommodate normal typing even if size were not an issue. Further, many people simply prefer the feel and performance of hardware based text and data input, such as a slide out keyboard on a cell phone to the feel and performance of text input on a touch screen. Finally, the slim and compact form factor of such devices often trades battery life and memory size for the small and thin overall design.

DETAILED DESCRIPTION OF THE INVENTION

Figure 1:
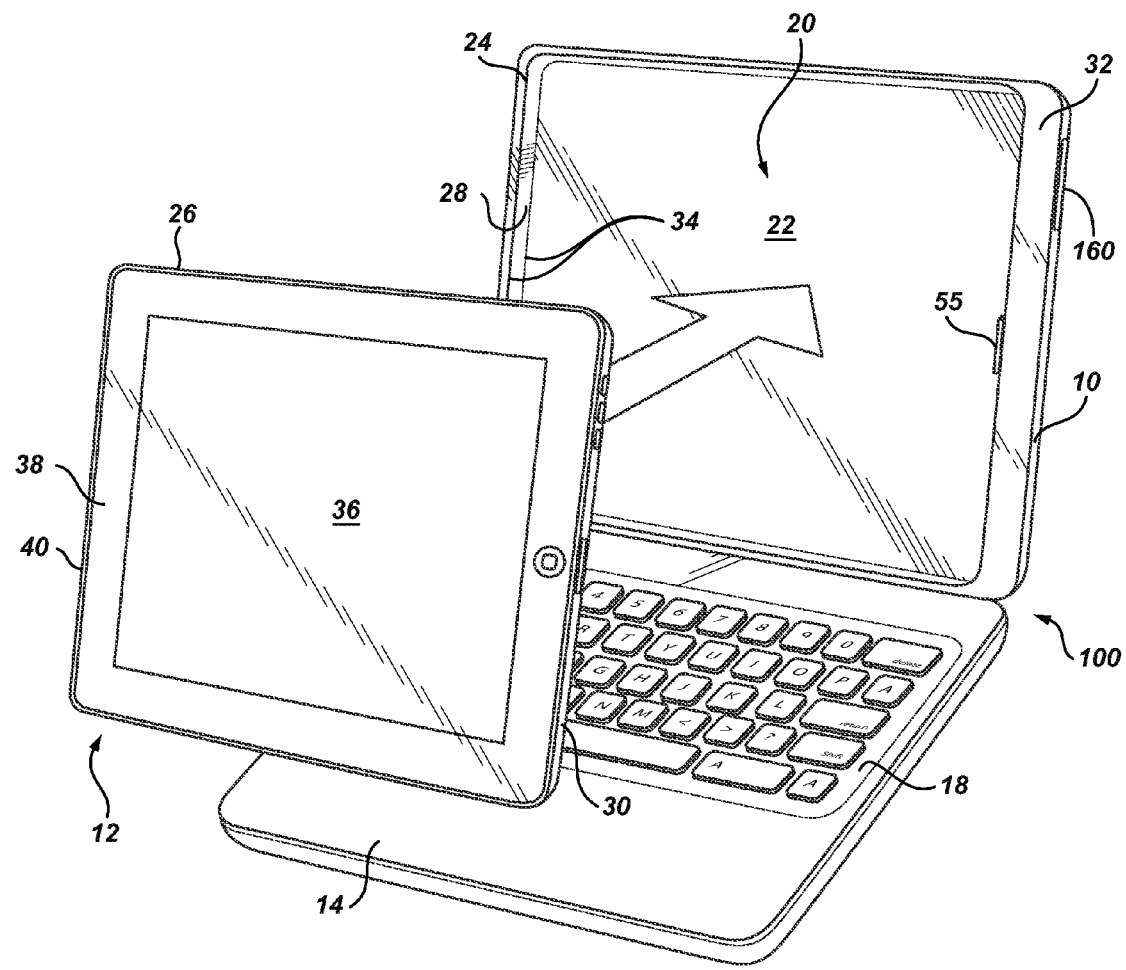
FIG. 1 is a front perspective view of a tablet computer case in an open position in accordance with one embodiment of the present invention.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "the hinge" includes one or more of such hinges, and reference to "a port" includes reference to one or more of such ports.

Definitions

In describing and claiming the present invention, the following terminology will be used in accordance with the definitions set forth below.

As used herein, the term "tablet computer" refers to any single piece computing device having a visual output or screen on one side of a substantially flat or planar casing, inside of which, the entire computing device (i.e. all computing components) is substantially contained.

As used herein, the term "communication connector" refers to any device or mechanism that allows input or output communication, or both, with a computing device. Examples of communication connectors include I/O ports, cords, wires, cables, lines, connections, etc., as well as wireless connectors such as WiFi, Bluetooth, infrared, and the like.

As used herein with respect to spatial orientation of an object, the term "portrait" refers to an orientation wherein a top to bottom height of the object greater than a side to side width of the object, and the term "landscape" refers to an orientation wherein a side to side width of an object is more than a top to bottom height of an object. These terms are well known in the art.

As used herein, the term "fascia" refers to any portion of a panel that overlaps and contacts a visual output side of a tablet computer. Typically fascia will lie flat against the visual output side of the tablet computer and extend along the outer periphery thereof to form a partial frame or a full frame of the visual output side. In one example, a fascia will at least partially overlie a bezel that surrounds the visual display of a tablet computer. Such a design aids in retaining the tablet computer in the panel as a whole, while allowing a user to view the visual output screen and to interact with the computer using the touch navigation interface.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. While the term "about" may not be expressly stated in reference to each and every numerical value mentioned herein, it is intended that this modifier apply to each and every numerical value mentioned unless otherwise stated.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Invention

The present invention provides a tablet computer case and methods for the use thereof. In one aspect, such a case may include components that expand the capacity and input options of the tablet computer. Generally speaking, the tablet computer case may include a first panel (also referred to as a "tablet panel") configured to releasably engage and hold a tablet computer of a predetermined size and shape, a second panel (also referred to as a "keyboard panel") having a keyboard, a hinge rotatably attaching the two panels, and a communication connector that allows the keyboard to communicate with the tablet computer.

The first panel of the case, in some embodiments, is configured to releasably engage and hold a tablet computer. In one aspect, the table computer can be held in the panel by a friction fit that prevents the tablet computer from unintentionally disengaging the first panel. In one embodiment, the first panel can have a back member with an overall shape that matches the shape of the back of the tablet computer. As such, the back of the first panel can contact and form fit to the back of the tablet computer when the tablet computer is engaged in the first panel.

Referring now to FIG. 1, according to an embodiment the tablet computer case 100 may include a tablet panel 10 configured to releasably engage and hold a tablet computer 12 of a predetermined size and shape, and a keyboard panel 14 having a keyboard side 16 on which a keyboard 18 is located. A hinge (not shown) rotatably attaches the two panels, and allows the two panels to swing or rotate about the hinge and relative to each other. When a tablet computer is fit into the tablet panel, the keyboard communicates with the tablet computer and is able to provide text input and optionally control other functions.

Referring again to FIG. 1, in some aspects of the invention, the tablet panel 10 can have a hollowed out bed 20 defined by a recessed back surface 22 and at least one raised side edge 24 extending along, and in some aspects around, the recessed back surface. Such a side edge can form a continuous or discontinuous perimeter around the back surface as further discussed herein.

In some embodiments, the side edge 24 may have an internal shape and/or size substantially matching, or corresponding to, a shape and size of an external edge 26 of the tablet computer 12, which is to be held in the hollowed out bed 20. In some aspects, the internal shape and/or size may match along at least one external edge of the tablet computer. In another aspect, the internal shape and/or size may match along at least two external edges of the tablet computer. In a further aspect, the internal shape and/or size may match along at least three external edges of the tablet computer. In yet another aspect, the internal shape and/or size may match along four external edges of the tablet computer. In yet another aspect, the internal shape/size match may extend along, the entire, or substantially the entire external perimeter of the tablet computer. As the shape and size of tablet computer perimeters can vary, so can the shape and size of the perimeter vary. In some aspects, the shape may be a polygon. In another aspect, the shape may be a quadrilateral. In yet another aspect, the shape may be substantially square. In a further aspect, the shape may be substantially rectangular. Furthermore, while the corners of the hollowed out bed may be sharp with a vertex, in some aspects, the corners may be rounded. In one aspect, at least one corner may be rounded. In another aspect, two corners may be rounded. In a further aspect, all corners may be rounded. In one embodiment, the shape of the hollowed out bed may have a shape and size substantially matching a shape and size of an IPad® brand tablet computer. In some embodiments, the tablet computer held in the hollowed out bed may be an IPad® brand tablet computer.

As also shown in FIG. 1, the raised side edge 24 of the hollowed out bed may in some aspects, have a flat inwardly facing surface 26. In some embodiments of the present invention, the flat inwardly facing surface may have a plane that intersects a plane in which the recessed back surface 22 resides. In one embodiment, the plane of the flat inwardly facing surface on the raised edge may intersect a plane in which the recessed back surface resides at an angle of from about 70 degrees to about 110 degrees. In yet another embodiment, the angle of intersection may be from about 80 degrees to about 90 degrees. In a further embodiment, the angle of intersection may be about 90 degrees. In some embodiments of the invention, the flat inwardly facing surface of the raised side edge may abut an external edge 26 of the tablet computer 12 when the tablet computer is fit into place and held in the hollowed out bed 20. In some aspects, the external edge of the tablet computer may include a flat outwardly facing surface 30. In another aspect, the edge may have a rounded, arcuate, or curved shape. In another aspect, the shape of the edge may be pointed or have a ridge or vertex. In some aspects, the abutment of an external edge of the tablet with the flat inwardly facing surface of a raised side edge may aid in holding the tablet computer in place in the hollowed out bed. In some aspects, abutment of opposing flat edges may further increase the hold of the tablet computer by the tablet panel. For example a friction fit can exist between the flat inwardly facing surface and the external edge of the tablet computer. In yet other aspects, aspects, the abutment of the flat inwardly facing surface and the external edge of the tablet computer may extend along at least one raised side. In another aspect, the abutment of the flat inwardly facing surface and the external edge of the tablet computer may extend along at least two sides of the raised side edge. In a further aspect, the abutment of the flat inwardly facing surface and the external edge of the tablet computer may extend along at least three sides of the raised side edge. In yet a further aspect, the abutment of the flat inwardly facing surface and the external edge of the tablet computer may extend along all sides of the raised side edge. In yet another aspect, the abutment of the flat inwardly facing surfaces and the external edge of the tablet computer may extend along the corners of the perimeter of the hollowed out bed. In an additional aspect, the abutment of the flat inwardly facing surface and the external edge of the tablet computer may extend along substantially the entire perimeter, whether continuous or discontinuous. In one embodiment, the raised side edge may bound, surround, or frame, substantially the entire hollowed out bed and have a substantially flat inwardly facing surface along substantially the entire length thereof. Furthermore, in some aspects, the abutment of the flat inwardly facing surfaces and the external edge of the tablet computer may extend along substantially the entire perimeter bounding, surrounding, or framing substantially the entire hollowed out bed.

In some embodiments, the raised side edge may also have a top surface 32 and a height 34 to which it extends above the recessed back surface. In some aspects, the height of the raised side edge may contribute to, or define, a depth of the hollowed out bed 20. In some aspects, the depth of the hollowed out bed may substantially match the thickness of the tablet computer.

In a different example, a difference may exist between the thickness of the tablet computer and the depth of the hollowed out bed. In some aspects, an insert having a thickness about equal to that difference can be placed between the tablet and the back surface so that the front of the tablet computer is in substantially the same plane with the top surface of the raised side edge. In another aspect, a difference may exist between a width or length of the tablet computer and a width or length of the hollowed out bed. In such aspect, an adapter piece can be configured having an external width and length that matches the dimensions of the hollowed out bed, and further including an internal compartment having dimensions that match the tablet computer and being made to engage and hold the tablet computer. The tablet computer can be placed inside the adapter, and the adapter with the computer held therein can be inserted into the hollowed out bed and held securely in said bed.

Figure 2:
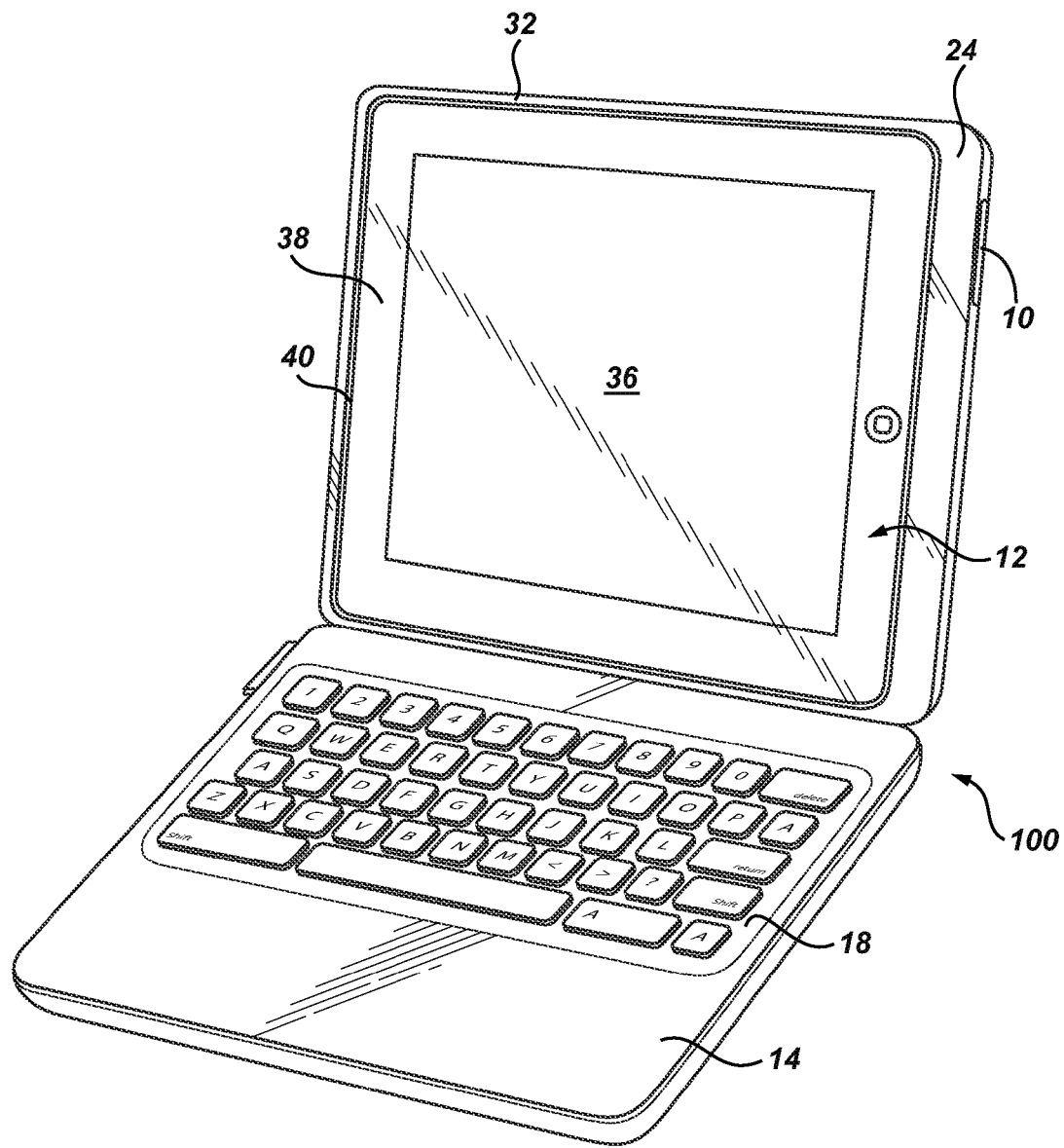
FIG. 2 is a front perspective view of a tablet computer case in an open position with a tablet computer held therein in accordance with one embodiment of the present invention.

Referring now to FIG. 2, a tablet computer 12 is shown being held in the hollowed out bed (not shown) of a tablet panel 10. The tablet panel has a raised side edge 24 extending around a recessed back surface (not shown). The raised side edge has a top surface 32. The depth of the hollowed out bed substantially matches the thickness of the tablet computer so that the screen 36 of the tablet computer is in substantially the same plane with the top surface of the raised side edge. However, in some aspects, the depth of the hollowed out bed and the thickness of the tablet computer may be different. In one aspect, the top surface of the perimeter edge may extend above the screen of the tablet computer when the tablet computer is fit into the hollowed out bed. In another aspect, the screen of the tablet computer may extend above the top surface of the perimeter edge when the tablet is fit into the hollowed out bed. Such embodiments and others allow the screen of the tablet computer to be readily exposed for use by a user. In some aspects, the entire screen of the tablet computer, or substantially the entire screen may be exposed, or fully exposed, when the tablet computer is engaged in the hollowed out bed of the tablet panel. In another aspect, substantially the entire screen and a bezel 38 of the tablet computer may be exposed. In yet another aspect, a front surface of a casing edge 40 of a tablet computer may be substantially exposed. In a further embodiment, the front surface of the casing edge of a tablet computer may be substantially exposed, or entirely exposed, along two opposing ends of the tablet computer.

Regarding the recessed back surface 22 of the hollowed out bed 20, any shape, configuration, or texture conducive to the engagement of a tablet computer into the hollowed out bed may be used. However, in one aspect, the recessed back surface may be solid, or unbroken, at all points within the perimeter edge. In another aspect, it may be broken or have one or more windows or openings therein as required to achieve a specific effect or result.

Figure 3:
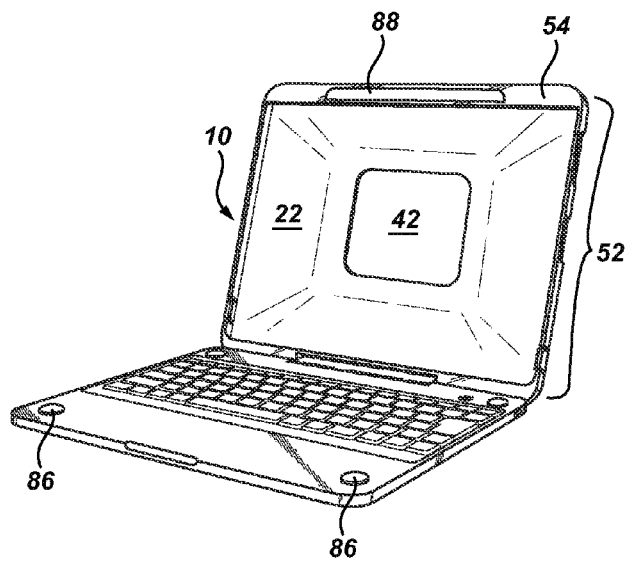
FIG. 3 is a front perspective view of a tablet computer case in an open position in accordance with one embodiment of the present invention.

Referring now to FIG. 3, in one embodiment, the back 22 of the first panel 10 can have an opening 42 or a window that allows display of a logo or other information contained on the back of the tablet computer. In different aspects, an area of the back or the entire back of the panel may be clear or at least translucent so as to allow viewing of any words or logos on the back of the tablet computer. Moreover, the back of the first panel can have other spaces or openings that allow a user to contact the tablet computer for insertion into and removal from the first panel. In an aspect, the size of the opening can be selected to affect the amount of material used by the case, the total weight of the case, or other characteristics of the case. For example, a larger opening can be included in the back of the first panel to provide a case having a lower total weight.

Figure 4:
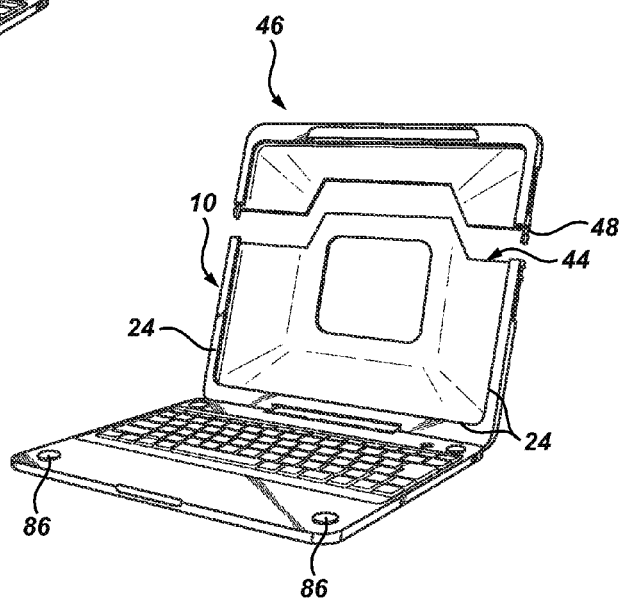
FIG. 4 is a front perspective view of a tablet computer case in an open position in spatial relation with a separate panel piece in accordance with one embodiment of the present invention.
Figure 5:
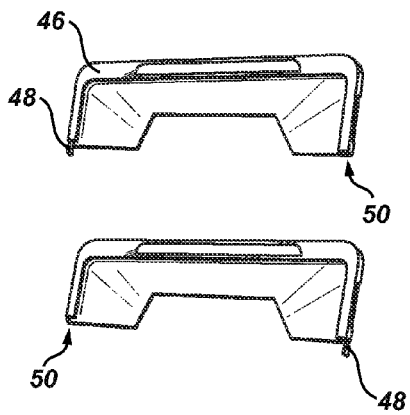
FIG. 5 is a front perspective view of two separated panel pieces in accordance with one embodiment of the present invention.

As discussed herein, the first panel may have one or more perimeter edges connected to the back panel and which also abut or otherwise engage a corresponding side or edge of the tablet computer when the computer is inserted into the first panel. In one embodiment, the first panel may have one, two, or three perimeter edges. In yet another embodiment, the first panel may have four perimeter edges. In the instance where less than four perimeter edges are present, at least one missing edge may create an opening to allow for insertion of the tablet computer into the first panel. In such embodiment, the tablet computer will directionally slide into the first panel. In one example of such an embodiment, shown in FIG. 4, the first panel 10 has three perimeter edges 24, between two of which is an open edge 44 through which a tablet computer can be slidably inserted into the first panel. As also shown in FIG. 4, it is additionally possible, but not essential, to provide a separate panel piece 46 configured to attach to the first panel. The first panel and/or the separate panel piece can include structural features that facilitate secure attachment. For example, as shown in FIGS. 4 and 5, the separate panel piece can include a protrusion 48 shaped so as to engage a corresponding recess 50 on the first panel, or vice versa. In an aspect, as shown in FIG. 5, the separate panel piece and the first panel can each have one protrusion and one recess, each positioned so as to engage a complementary feature on the other piece. In addition, the separate panel piece can friction fit around an exposed portion of the tablet computer so as to provide the visual effect of a full panel. Such a two piece first panel may be used to provide a combination of desired aesthetics and functionality.

In an additional embodiment where four side edges are present, the tablet computer may snap or push into the first panel through an open front and be retained therein through a friction fit or other mechanical mechanism, such as a fascia that is subsequently connected to the first panel, or integral therewith. In the case of the latter, the fascia may be very narrow and only sufficient to aid in retaining the tablet computer in the first panel.

The front of the first panel may in some aspects include a viewing window through which the screen of the tablet computer may be viewed. In some embodiments, the viewing window is an opening. In other embodiments, the window can be partially or completely closed using a transparent material that still allows viewing of the tablet computer screen. In one aspect, the transparent material may be sufficiently thin as to allow substantial touch navigation on the screen interface there through.

As also shown in FIG. 3, the viewing window 52 may include a fascia border 54 that extends along one or more sides of the viewing window and integrally connects and attaches to the side edges present in the first panel 10. The fascia can extend along a portion of the tablet computer's viewing screen and may aid in retaining the tablet computer in the first panel and may fit snugly against the viewing window. In another aspect, the fascia may effectively frame the viewing window, and in some cases overlap a bezel around the viewing window. Further, in some embodiments, a fascia piece may exist even where there is no corresponding first panel side edge. In this case, the fascia may attach to other fascia pieces and provide a bridge over the side edge opening through which the tablet computer slides to engage the first panel. Such a fascia piece can aid considerably in the retention of the tablet computer in the first panel.

In one aspect of the present invention, the tablet computer may be inserted through an open edge of the first panel and become completely inserted when the inserted tablet end engages a side edge opposite the opening through which the tablet was inserted. The first panel may be configured in either a portrait or landscape orientation. In some embodiments, when in the landscape orientation, the open edge may be on the left hand side of the first panel and the tablet computer engages the side edge on the right hand side of the first panel when it is fully inserted. In other embodiments, the open edge may be at the top of the first panel. In this or other configuration, or in other configurations, the side edges of the first panel may include one or more small access slots substantially matching the location of any input or output mechanisms or ports on the tablet computer. Examples of such functional features to be accessed may include without limitation, buttons, pin connectors, speakers, headphone jacks, dials, switches, or slide bars. In yet another embodiment, the opening into the first panel may be along a top portion when the panel is in landscape orientation. Again, a variety of optional mechanisms may be used to close such an opening, if desired, after insertion of a tablet computer into the first panel, such as a cap or other piece that friction fits onto the exposed edge of the tablet computer.

Referring again to FIG. 1, in some embodiments of the present invention, one or more of the first panel side edges may include a connector 55 that is built into the and edge, including a side edge, and located at a location substantially corresponding to an I/O or other port on the tablet device, and with which the connector will engage and communicate. One example is the 30 pin I/O port on the bottom of the IPAD®. In the embodiment where the IPAD slides into an opening on the left hand side edge of a horizontally oriented first panel, a matching 30 pin I/O connector may be included at a corresponding location on the inside of the right side edge. As such, when the IPAD® fully engages the first panel by contacting the right side edge, the I/O port on the IPAD® will automatically mate with the I/O connector on the right side edge. The I/O connector is a component of the overall communication connector and further discussion of the connecting system will be provided hereafter. In alternative embodiments, the connector between the keyboard and tablet computer may be a wireless connection, such as a Bluetooth or other WiFi connection.

In addition to the foregoing, in some aspects, the first panel may have other devices or accessories included therein. In one example, a camera, such as a video or web cam may be included in the fascia of one of the side edges of the first panel, or at another location such as the back side of the first panel. Further, in one embodiment, the first panel may have only fascia forming a frame around the front viewing window and also on the back of the first panel. In this embodiment, the tablet computer engages the front and back fascia and is held in a friction fit there between. In this embodiment, optionally, no side edges are necessary or used. In yet another embodiment the first panel may have a back, and the front may be a fascia bordering the entire viewing screen and the fascia may be held to the back of the first panel with a plurality of individual connectors, such as posts, screws, bolts, etc.

The second panel of the tablet computer case of the present invention, may in some embodiments, weigh more than the weight of the first panel with the tablet computer engaged therein. Such an embodiment can prevent, reduce, or minimize the incidence of device tipping, such as falling or tipping over when the second panel is placed on a flat surface with the first panel extended up at a 90° or greater angle, such as when used like a traditional laptop computer. Alternatively, one or more legs, posts, or segments, may be included in the first panel which can actuate to rest on a flat surface on which the tablet computer is placed and thereby support and hold the first panel at an angled position such as that of a traditional laptop, and prevent the device from falling over.

In other embodiments of the present invention, the second panel may weigh substantially the same, or less than the first panel with the tablet computer engaged therein. In some aspects, the second panel may weight about equal with the first panel with the tablet computer engaged therein. In an additional aspect, the second panel may weigh about 20% less than the weight of the first panel with the tablet engaged therein. In yet another aspect, the second panel may weigh about 10-70% less than the first panel with the tablet computer engaged therein. In a further aspect, the second panel may weigh about 50% less than the first panel with the tablet computer engaged therein.

Figure 6:
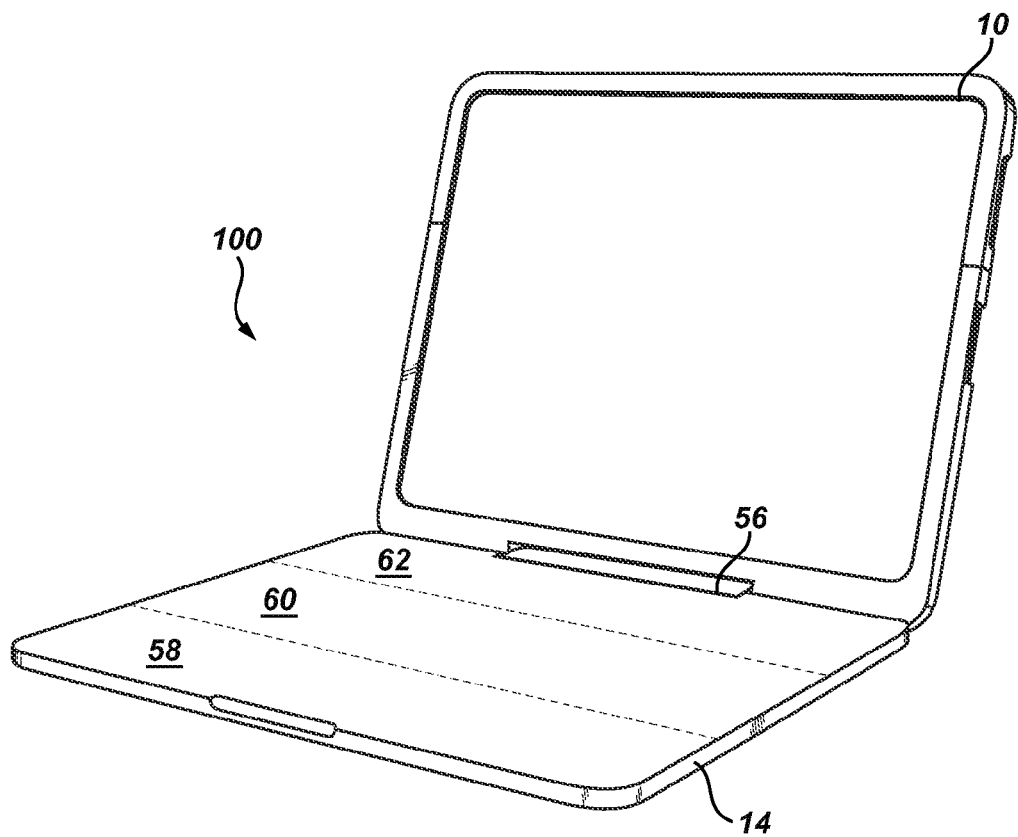
FIG. 6 is a front perspective view of a tablet computer case in an open position in accordance with an embodiment of the present invention, showing delineated areas of the keyboard panel.

Referring now to FIG. 6, a perspective view is shown of a tablet computer case 100 having the first panel 10 and a second panel 14 (keyboard not shown) connected by a hinge 56. In such embodiment, the total weight of the second panel can be selectively distributed among a distal third 58, a medial third 60, and proximal third 62 of the area of the second panel, where each location is named according to its location with respect to the hinge. In a particular embodiment, the total weight of the second panel is distributed in a pattern that increases in a direction from the proximal third of the second panel toward the distal third. In some aspects, a disproportionate majority of the weight in the second panel can be in the distal third and medial third combined. For example, from 67% to 95% of the total weight of the second panel can be located in the distal third and medial third combined. Alternatively, the majority of the total weight can be in one third of the second panel only. In one example, greater than 50% of the total weight of the second panel is located in the distal third. In another example, greater than 50% of the total weight of the second panel is located in the medial third. In some cases the amount of weight placed in the distal third and/or the medial third, or the total weight distribution gradient or pattern between all areas of the second panel may be sufficient to substantially minimize or prevent the keyboard case from tipping when the first panel is placed at an obtuse angle with respect to a plane of the keyboard panel, even when the second panel as a whole weighs less than the first panel with the tablet computer engaged therein. In some aspects, the obtuse angle may be from about 91 degrees to about 160 degrees. In another aspect, the obtuse angle may be about 120 degrees. In a further aspect, the obtuse angle may be from about 110 degrees to about 140 degrees.

In other aspects, at least 15% of the total weight of the second panel may be in the distal third 58 of the keyboard panel. In another aspect the amount of weight may be from 20%-80%. In yet another aspect, the amount of weight may be at least 40% or at least 50%. In a further aspect, at least 40% of the weight of the second panel may be in the distal third and medial third 60 of the second panel. In an additional aspect the amount of weight in the first and second thirds may be from 30% to 95% of the second panel. In yet another aspect, the amount of weight may be at least 80% or 95% of the total weight of the second panel. In additional aspects of the invention, the weight gradient of the second panel may be customized to provide any gradient or pattern of weight in the second panel that will allow the tablet case of the present invention to keep from tipping when the first panel is placed at an obtuse (i.e. 90 degree or greater angle) in relationship to the plane of the second panel all while the second panel weighs less than the first panel with the tablet computer engaged therein. Such weight profiles, gradients, arrangements, and distributions may be achieved by placing weights (i.e. a weight or mass with no function other than to provide weight), or other components, such as those further described below in specific locations required to provide the intended weight configuration.

Figure 7:
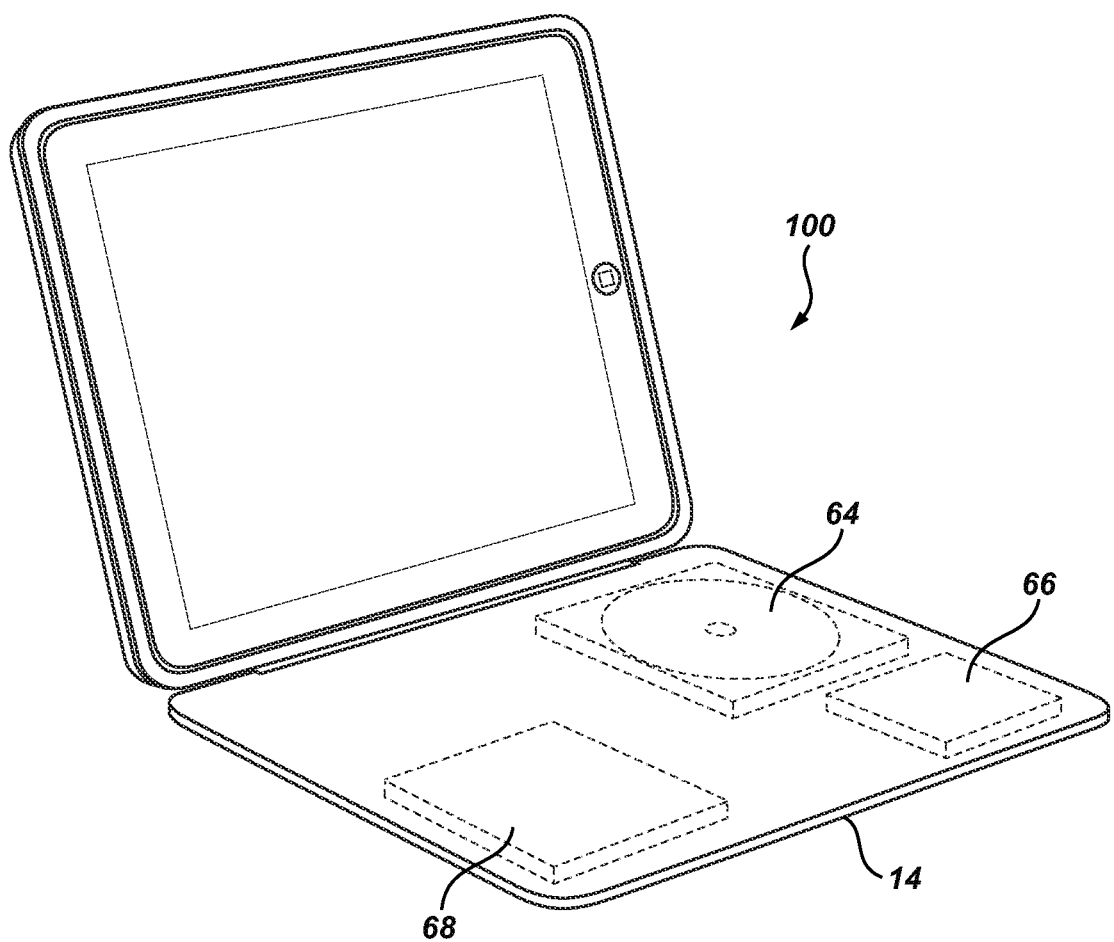
FIG. 7 is a transparent perspective view of a tablet computer case in an open position, showing components therein in accordance with an embodiment of the present invention.

It will be noted that a variety of components can be included in the second panel in addition to the keyboard. Such included components can advantageously expand the overall capacity and functionality of the tablet computer and allow it to function much more like a laptop computer. Examples of components include without limitation, a power input, a power source, such as a battery, a memory module (i.e. hard drive), a readable or readable/writable disk component, such as a CD or DVD player, sound speakers, a mouse controller such as a touch pad or point stick, USB ports, SD ports, or other memory ports, as well as VGA or other output ports for outputting signal audio and video signal to additional devices. For example, the memory module may increase the size of available memory, the battery may expand the battery life, and the power input may allow the tablet computer to run on A/C power while engaged in the case. One example is shown in FIG. 7, where a tablet computer case 100 includes a second panel 14, a transparent view of which shows a CD ROM drive 64, a hard drive 66, and a battery 68 installed therein. It is noted that this is one possible configuration, and that numerous other configurations and arrangements are possible using components suited for portable computing.

Figure 8:
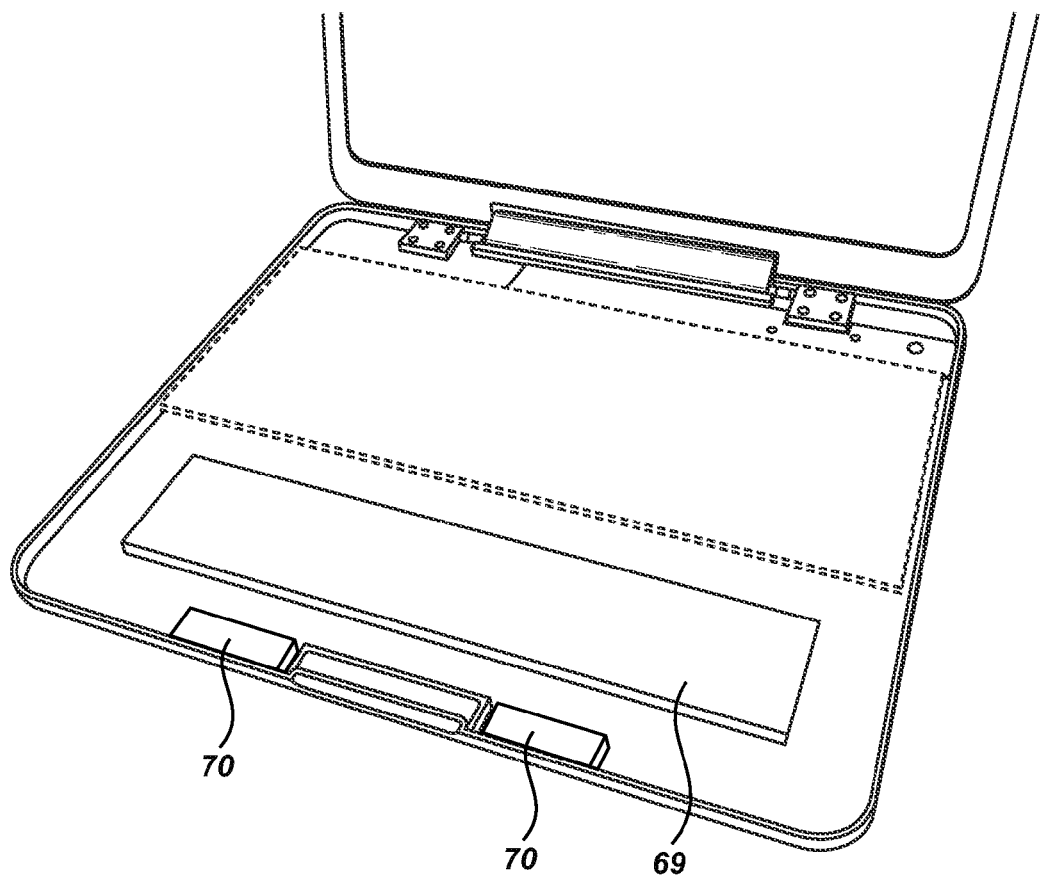
FIG. 8 is a transparent top view of a keyboard panel of a tablet computer case showing components therein in accordance with an embodiment of the present invention.

In accordance with an embodiment, such functional components can be utilized and specifically placed in the second panel in order to provide the weight distribution and configurations for the second panel as mentioned above. In addition, as shown in FIG. 8 at least one weight 69 can be added that are non-functional components in order to aid in achieving a desired weight distribution. In another aspect as also shown in FIG. 8, one or more members 70 of a magnetic closure can be included in the second panel and placed so as to aid in achieving a weight distribution as well as in securing the case in a closed position. For example, magnetic closure can include a first member (e.g. a magnet) and a second member that is a magnetic element such as a piece of metal, where one member is located near an edge of the first panel and the other member is located in a distal edge of the second panel. This placement allows the member in the second panel to engage with the member in the first panel to hold the case closed. In addition, the same placement of the member in the second panel can add weight to the distal portion of the second panel so as to aid in minimizing tipping when the computer case stands open for use as a laptop.

In yet an additional embodiment of the present invention, a hard drive in the second panel may include software that allows operation of a mouse controller with the tablet computer or other manipulation or navigation of the tablet computer. Such software may effectively work in combination with, or convert the touch navigation of the tablet computer, to allow mouse and keyboard based navigation in place of, or in addition to, the touch based navigation. Further, such software may provide an overlay or mask on the touch based operating system which effectively converts the touch based operating system to a traditional computing operating system, such as the MAC OSX, Microsoft Windows®, etc. The conversion of the operating system may be a true conversion of the system, or may be a mask or overlay only where the graphical user interface appears like a non-touch navigation system, but actual computing function remains within the touch based navigation system protocols. Such a mask would effectively allow the user to control the tablet computer in the manner of a traditional operating system with keyboard and mouse inputs, while the actual inner workings of the tablet computer remain unchanged from the original touch navigation system.

The keyboard of the second panel can be of any design or layout as required to meet a specific need. Text keys, function keys, programmable keys, etc. can be included. In one aspect, the keyboard can be full sized or a small size that is sufficient to still allow typing with both hands simultaneously in a traditional fashion. In another aspect, such as when the tablet computer is a cell phone or smaller device, the keyboard may be a QWERTY keyboard or other keyboard of appropriate size to allow operation with individual fingers or thumbs of one or both hands. Moreover, the keys may protrude from the panel to a specifically desired height, be flat or flush with the panel, or may be retracted into the panel automatically upon articulation of the second panel into a position behind the first panel.

Figure 9:
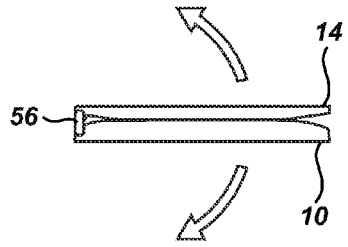
FIGS. 9 through 14 are side cross-section views of a tablet computer case in accordance with the present invention, showing successive panel positions achieved by actuation of the hinge.
Figure 12:
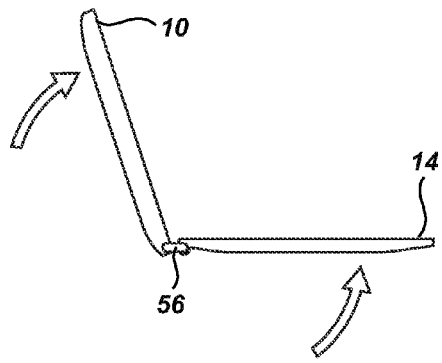
Figure 10:
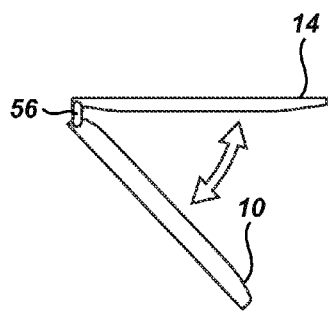
Figure 13:
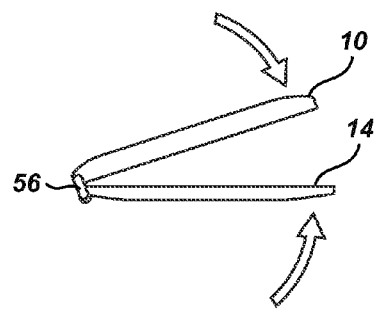
Figure 11:
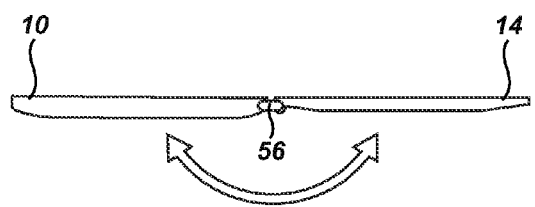
Figure 14:
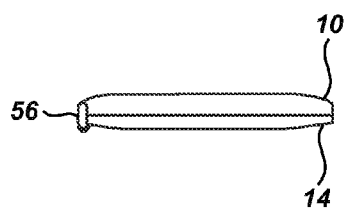

The first and second panels of the case are connected by at least one hinge. In one embodiment, the hinge engages a bottom edge of the first panel and connects the first panel to a back edge of the second panel. Thus connected, the first and second panels can be positioned with respect to one another in a variety of specific configurations. At one extreme, the hinge allows the first and second panels to pivot into a position where the viewing screen of the tablet computer and the keyboard come together and face one another. In some aspects, the keyboard may touch, or nearly touch the viewing screen of the tablet computer when the panels close on one another and come together. At another extreme, the hinge allows the first and second panels to pivot into a position where the viewing screen and the keyboard move apart and face substantially away from one another. This includes facing in opposite directions. In this position, the back of the first panel and the back of the second panel may come together and touch one another. In some embodiments, the backs of each panel may substantially contact one another along multiple points of their surfaces. In this second extreme position, the first and second panels are rotated substantially 360° from the first position wherein they are facing and nearly touching one another. Moreover, the hinge may be spring loaded or otherwise tensioned so as to allow the first panel to maintain a fixed position at nearly any specifically desired angle of orientation within its 360° rotation with respect to the second panel. As shown in FIGS. 9 through 14, such freedom of rotation allows a plurality of positions providing differing modes of accessibility to the viewing screen 36 of the tablet computer. As shown in FIG. 9, a first position ("tablet position") is when the first panel 10 and second panel 14 are closed in a back-to-back configuration with the view screen and keyboard (not shown) facing in opposite directions of one another. In this orientation, the viewing screen of the tablet computer may be viewed and used as a tablet with touch interface, etc. A second position of accessibility ("display position") is obtained when the first panel is moved to a position that is 90° or less from the first position, as shown in FIG. 10. In this orientation, the keyboard remains facing down in an inaccessible position, but the screen is now tilted up from the original flat orientation to an angled orientation. With this angled viewing orientation, the viewing screen may be conveniently viewed for many activities, such as watching a movie, presenting a video presentation to an audience, or further navigating the touch screen interface of the tablet computer. A third position of accessibility ("laptop position") may be obtained when the first panel is further actuated away from the first and second position as shown successively in FIGS. 11 and 12, to where the keyboard of the second panel faces up and is usable by a user and the viewing screen is positioned at a 90° or greater angle with respect to the keyboard side of the second panel. Such a position places the device in a configuration that is like that of a traditional laptop computer where the keyboard can be used by a user while the user simultaneously views the viewing screen. Finally, the rotation of the panels past the third position into a fourth and final position, as shown successively in FIGS. 13 and 14, where the device closes with the screen of the tablet computer and keyboard substantially opposing one another in an opposing manner ("closed position") may be used for storage when the device is not in use. Such orientation allows for protection of both the touch screen of the tablet computer and the keyboard in the second panel.

Figure 15:
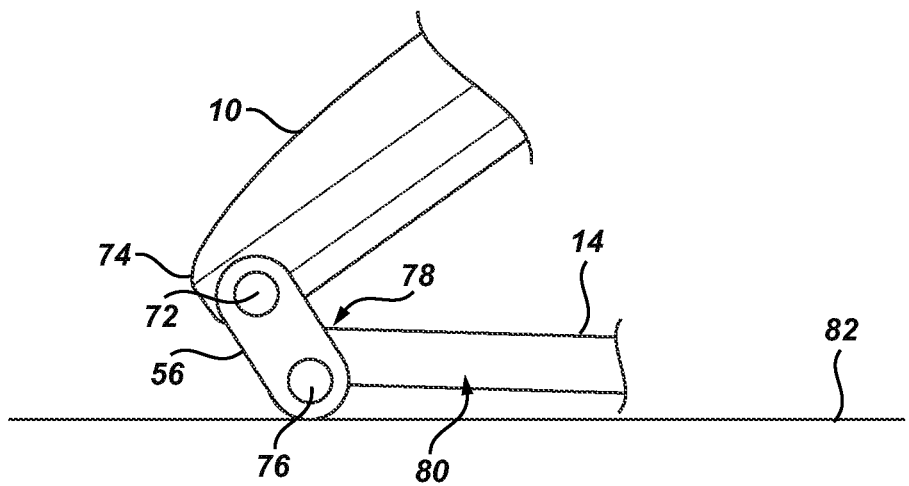
FIGS. 15 and 16 are side cross-section views of the hinge of a tablet computer case in accordance with an embodiment of the present invention, showing two stages of opening said tablet computer case from a closed position to a laptop position.
Figure 16:
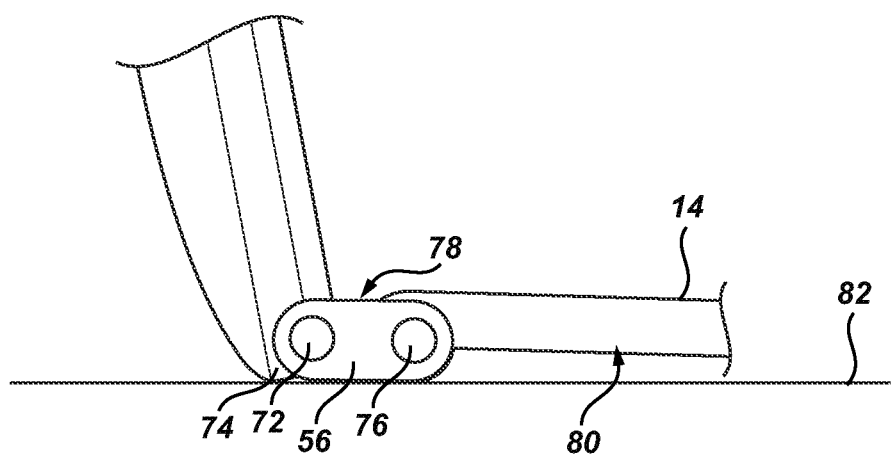
Figure 17:
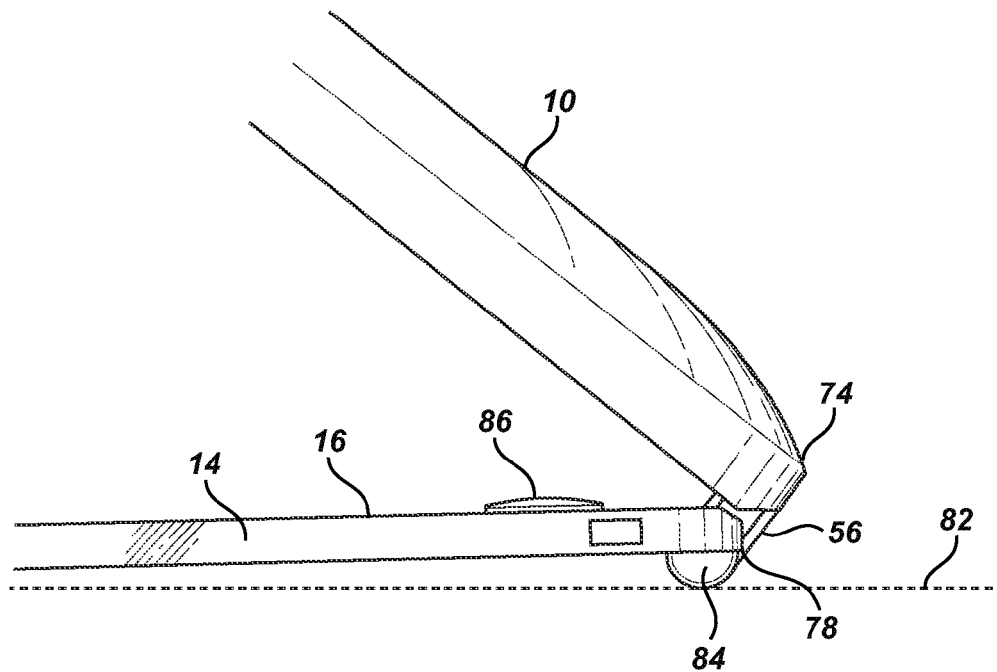
FIGS. 17 and 18 are side views of the hinge of a tablet computer case in accordance with an embodiment of the present invention, showing two stages of opening said tablet computer case from a closed position to a laptop position.
Figure 18:
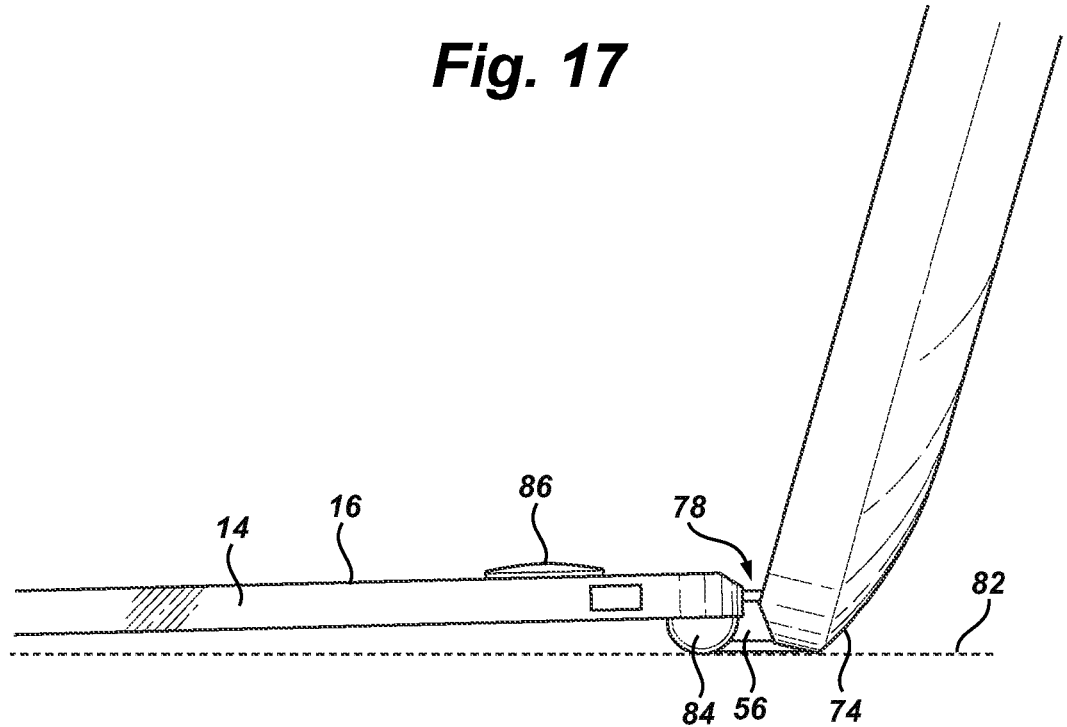

In addition to the weight distribution and design of the second panel as described above, the tablet computer case of the present invention can utilize specific hinge configurations in order to allow reduction and/or control of the weight of the second panel while preventing the device from tipping when used in a laptop configuration with the first panel at an obtuse angle with respect to the second panel. Referring now to FIGS. 15 and 16 in which is shown a cross section of a hinge 56 attaching the first panel 10 and second panel 14 of the present case together. A side view thereof is shown in FIGS. 17 and 18. As can be seen in FIGS. 15 and 16, the hinge is a double hinge with dual action having a first rotational axis 72 adjacent to the bottom edge 74 of the first panel and a second rotational axis 76 adjacent to the back edge 78 of the second panel. It should be noted that the terms "bottom edge of the first panel" and "back edge of the second panel" as used in this way refer to the locations of these edges relative to their respective panels when the case is in a laptop position. Other terms could be applied to describe the location of these particular edges in other positions from a user's point of view. However, to preserve clarity and continuity in the following discussion, the terms "bottom edge of the first panel" and "back edge of the second panel" are used herein to refer to the edges attached to the hinge regardless of case position.

Each rotational axis allows the respective panel to rotate up to 180 degrees and collectively allow a panel to rotate effectively 360 degrees. As also shown in FIGS. 15 through 18, the case of the present invention is oriented with the underside 80 of second panel 14 resting on a horizontal surface 82 and defining a plane. As used herein in reference to the second panel, the term "underside" refers to the surface as well as any other features associated therewith (e.g. feet), that support the tablet computer case through contact with an underlying surface. The first panel 10 is angled as the case is in the act of rotating from a closed position to an open position. In one aspect of the present invention, the hinge 56 may be configured with a greater tension about the first rotational axis 72 than the second rotational axis 76. As shown in FIG. 15, with greater tension in the first rotational axis, the second rotational axis is caused to initially actuate upon opening the case from a closed position where the tablet computer and keyboard face one another in an opposing manner. With the second axis engaging in initial rotation, the angle of the hinge with respect to the first panel remains acute or at substantially 90° while the first panel moves, and until the bottom edge 74 comes to rest in the same plane (i.e. on the same surface 82), or substantially the same plane, as that of the second panel. With the edge of the first panel resting on such surface, a portion of the weight of the first panel rests on the surface and reduces the amount of weight required of the second panel in order to reduce, minimize, or prevent an incidence of tipping of the case as recited above.

The tension differences between the first rotational axis and the second rotational axis in the hinge may be set at any combination that allows for smooth and fluid operation of the device from a closed position to an open position with the screen in viewable orientation with keyboard exposed for use (i.e. laptop orientation). However, in one aspect, the tension of the first rotational axis may be about 10% greater than the tension on the second rotational axis. In yet another aspect, the tension of the first may be about 20% greater than the second. In an additional aspect, the tension of the first may be from 30% to 400% greater than the tension of the second. In a particular example of this aspect, the tension of the first is from 50% to 300% greater than the tension of the second. In another example, the tension of the first is from 70% to 200% greater than the tension of the second. In other examples, the first rotational axis can have tension that is greater by 30% to 100%, or 80% to 100%, or 50% to 400%, or 50% to 200%, or 100% to 400%, or 30% to 70%. As can be seen in FIGS. 9 through 14, further rotation of the first panel 10 and second panel 14 with respect to one another is enabled by continued rotation of the second axis and by commencing rotation of the first axis. Such rotation allows movement of the panels into all of the positions enumerated above.

In accordance with the concepts discussed herein, methods of adding a keyboard to a tablet computer and making a tablet computer case that accomplishes such an addition can comprise configuring and attachment of the elements described. More specifically, the concepts and innovations discussed herein are applicable to a method of adding a keyboard to a tablet computer, a method of minimizing tipping in a tablet computer case, and a method of making a tablet computer case with enhanced stability. In particular, such methods can comprise configuring a first panel to hold the tablet computer and attaching the first panel by way of a hinge to a second panel having a keyboard. As discussed above, the hinge, and/or keyboard weight can be configured so as to reduce or minimize tipping (i.e. improve or maximize stability) of the tablet computer case, particularly when employed in a laptop position (i.e. with the screen in viewable orientation with keyboard exposed for use). In accordance with the present invention, any one or more of these hinge configurations and action may be used in making the inventive case with enhanced stability and in minimizing tipping of such a case. Furthermore, any one of the weight schemes for the second panel as recited above can be used either by itself, or in connection with any of the hinge configurations, in order to provide this stability. The weight schemes can further allow reduction of the overall weight of the second panel, and therefore reduction of its thickness and reduction of the weight and size of the overall device. Accordingly, the thickness of the second panel and/or the first panel can be varied in order to provide a desired effect.

Thickness and weight are typically of great concern in personal electronics. In one aspect, the greatest thickness of the second panel can be less than a greatest thickness of the first panel. In one example, the greatest thickness of the second panel is from about 20% to about 80% of the greatest thickness of the first panel. In another example, the greatest thickness of the second panel is from about 30% to about 50% of the greatest thickness of the first panel. In still other examples, the greatest thickness of the second panel is from 30% to 40%, or from 20% to 40%, or from 40% to 60%, or from 50% to 80% of the greatest thickness of the first panel. In another aspect, the second panel can have a greatest thickness of from about 4.0 mm to about 10.0 mm. In a particular example, the greatest thickness of the second panel is from about 5.0 mm to about 7.0 cm. In another example, the greatest thickness of the second panel is from about 6.0 mm to about 9.0 cm.

In addition to a hinge as described above, the tablet computer case of the present invention may utilize instead a ball hinge, a post hinge, or other hinge which allows the first panel to rotate in a circular direction in substantially the same plane as the second panel. In such an embodiment, the panels may be oriented into a first position where the viewing screen and keyboard face one another and the panels are closed together. A post hinge or other type of pivoting device can be located substantially in the middle of the back edge of the second panel and the bottom edge of the first panel connecting the two at that single hinge point. Next, the first panel may be rotated in either a clockwise or a counter clockwise direction for 180° and raised up so that it now is moved into a second position of accessibility with the keyboard of the second panel facing up and being usable, and the view screen facing away from the keyboard and the first panel forming a 90° or less with respect to the second panel. Finally, the first panel can be folded flat into the first position of accessibility where the first and second panels are flat against one another and the viewing screen can be viewed and the tablet computer used as a tablet. In this case, however, the viewing screen and keyboard will face the same direction, though the keyboard will not be usable as it is covered by the first panel.

In another embodiment, a tablet computer case of the present invention can comprise a first panel configured to releasably hold a tablet computer, and further a keyboard that is permanently attached to the first panel. In one aspect, such a case can also utilize a ball hinge, a post hinge, or other hinge which allows the first panel to rotate in a circular direction relative to the keyboard. Alternatively, the keyboard can be attached by a slider mechanism that allows the keyboard to slide out and pivot to a laptop position or slide behind the first panel or into a compartment when not in use. These and other permanent attachments are also contemplated for use with hinge configurations and/or weight distributions discussed herein to minimize or reduce tipping (i.e. improve or maximize stability) in a laptop position.

As shown in FIGS. 17 and 18, the hinge 56 can also be configured so that a part of the hinge provides a foot structure 84, where when the tablet computer case is opened into a laptop position on a surface 80, the foot structure contacts the surface and at least partially supports the case. In addition, the location of the hinge and foot structure can also result in the second panel being raised at an angle relative to the surface, and in some embodiments may further aid in improving/maximizing stability and reducing/minimizing tipping. Consequently, the keyboard is also presented to a user at an angle that can enhance keyboard visibility and increase user comfort when using the keyboard.

A wide variety of additional movements and articulations are possible with the case of the present invention in order to provide desired accessibility and function. It is to be noted that in some embodiments, when the first and second panel are brought together, or when the keyboard is inaccessible by the user because it is either covered by the first panel, or faces in a direction away from the viewing screen, that the keyboard can be disabled to prevent inadvertent activation thereof or input into the tablet computer. This deactivation can be automatic and occur when the viewing screen and keyboard move outside a specific range of orientations for one another, or can be manually made to happen. In an additional embodiment of the invention a sliding cover may be included in the second panel that hides or otherwise blocks the keys from being touched or used. Such a panel can have a simple lip thereon or other mechanism for grasping or purchasing the panel to move it from an open position to a closed position or visa versa.

Referring again to FIGS. 17 and 18, in one embodiment the second panel 14 can also include one or more spacers 86 attached on the keyboard side 16 or surface. Such spacers can be configured and located to serve a plurality of functions. In one aspect, the one or more spacers can serve to separate the keyboard surface from the first panel 10 in a closed position. This arrangement can protect the keyboard and/or the tablet computer from any wear or damage that could arise from repeated contact with the second panel or portions thereof. In addition, the spacers, can contribute to maintaining a particular overall profile of the closed case based on the dimensions of the panels and the hinge 56. In another aspect, the one or more spacers can stably support the tablet computer case on a surface in a position where the keyboard side is facing down toward the surface, e.g. a display position. In addition to providing stability to the case and the computer in such a position, the spacers also serve to protect the keyboard from contact with the surface.

The configuration and number of the spacers can be selected so as to adequately provide the above functions. Accordingly, in one embodiment at least one spacer is attached to the keyboard side or surface of the second panel. In a more particular embodiment, at least two spacers are so attached. In a still more particular embodiment, at least four spacers are so attached. The spacers can have a variety of shapes and sizes. In one aspect, the spacers may be round. In another aspect they may be elongated. In a further aspect, they may be square. Other shapes are also possible, such as oblong, curved, flat, domed, ribbed, etc. In one aspect, the one or more spacers have a thickness that provides a particular spacing in one or more case positions. In a particular example, the spacer has a thickness of from about 1/16 inch to about 1/2 inch. The arrangement of the spacers can also be selected so as to serve the above functions. For example, a spacer can be located centrally relative to an edge of the keyboard side. Alternatively a spacer can be located at a corner of the keyboard side. In one aspect, a spacer is removably attached, such as with a releasable adhesive, allowing the spacer to be placed in a desired location.

In addition to the foregoing, a variety of other mechanisms may be used in connection with the hinge configurations of the present case. For example, slide tracks may be used to allow the first panel to slide over the top of the second panel while both keyboard and viewing screen face the same direction. Once the first panel is slid out away from the second panel to expose the keyboard, the hinges may engage to allow pivoting of the first panel up into a position that is viewable by a user while using the keyboard, such as between 175° and 60° with respect to the keyboard surface.

The communication connector can in some embodiments include an I/O connector that is fixed on an inside edge of the first panel and which is aligned with an I/O port on the tablet computer. A single I/O connector and port may be used, or multiple. A wide variety of designs and systems may be utilized in order to accommodate the specific requirements of a given tablet computer. In one aspect, an access slot may be provided on the edge of the first panel at the location of the tablet computer's I/O port(s) and a suitable I/O connecter utilized and extended there through. The I/O connector used in the first panel will then be connected to the hardware devices provided in the second panel in order to allow sufficient communication from those devices to the tablet computer. Those of ordinary skill in the art will recognize suitable cords, cables, connectors, wires, and lines for such purpose.

The case of the present invention may further utilize a mechanism for keeping the first and second panels retained together when the device is in a closed orientation as reference above. Clasps or latches may be used in one embodiment. In an additional embodiment magnets may be positioned at specific locations along the one or more outer edges of the second panel and a corresponding magnet or metal strip in the first panel which will be attracted to the magnet(s) in the second panel. A number of magnet-magnet or magnet-metal strip configurations can be used. In one embodiment as shown in FIGS. 3 and 8, metal strips 88 may be placed in or behind the fascia segments of the first panel with corresponding magnets 70 residing along the outer edges either inside or outside of the second panel. Thus when the panels are brought together in a closed orientation, the panels will remain together due at least in part to the attractive force between the magnet and the metal strips. It is noted that the tensions in the first rotational axis of the hinge may also aid in keeping the case closed and can be utilized in combination with the amount of force provided by the magnetic closure mechanisms. The magnets may serve an additional purpose of turning the tablet computer off and on when tablet computers with a magnet actuated on and off switch are used with the case of the present invention, such as the switch used in the tablet computer sold by Apple under the brand IPad 2.

The materials used in the fabrication of the case of the present invention may include any suitable materials required to achieve a given purpose. Examples of suitable materials include without limitation polymer and plastics, metals and alloys, and ceramics. Those of ordinary skill in the art will recognize materials suitable for the varying components in order to obtain desired function.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A tablet computer case comprising: a first panel configured to releasably engage and hold a tablet computer of a predetermined size and shape;
   at least one side edge which engages an edge of the tablet computer, and a fascia that extends along a portion of a visual output side of the tablet computer and that is integral with the at least one side edge;
   a second panel having a keyboard side on which a keyboard is located, said second panel weighing substantially less than the first panel with the tablet computer engaged therein;
   a hinge rotatably attaching the first panel and the second panel;
   wherein the hinge comprises a first rotational axis adjacent to a bottom edge of the first panel and a second rotational axis adjacent to a back edge of the second panel, and wherein the hinge is configured so that the bottom edge of the first panel can rest in substantially a same plane as an underside of the second panel and a portion of the hinge when the first panel is at an angle of at least about 90° with respect to the second panel; and
   a communication connector that allows the keyboard to communicate with the tablet computer; wherein a distribution of a total weight of the second panel minimizes tipping of the tablet computer case when the first panel with the tablet computer engaged therein is placed at an obtuse angle with respect to the second panel.

2. The tablet computer case of claim 1, wherein the second panel weighs about 10% to about 70% less than the first panel with the tablet computer engaged therein.

3. The tablet computer case of claim 1, wherein the second panel weighs about 50% less than the first panel with the tablet computer engaged therein.

4. The tablet computer case of claim 1, wherein the second panel weighs about 20% less than the first panel with the tablet computer engaged therein.

5. The tablet computer case of claim 1, wherein the total weight of the second panel is distributed in a pattern that increases in a direction from a third of the second panel proximal to the hinge toward a third of the second panel distal to the hinge.

6. The tablet computer case of claim 5, wherein from about 67% to about 95% of the total weight of the second panel is located in the third of the second panel distal to the hinge and a medial third of the second panel combined.

7. The tablet computer case of claim 5, wherein greater than 50% of the total weight of the second panel is located in the third of the second panel distal to the hinge.

8. The tablet computer case of claim 5, wherein greater than 50% of the total weight of the second panel is located in the medial third of the second panel.

9. The tablet computer of claim 1, wherein the total weight of the second panel comprises components arranged therein to achieve the distribution.

10. The tablet computer case of claim 9, wherein the components include functional members selected from the group consisting of: a mouse controller, a power input, a power source, a memory module, a readable disk component, sound speakers, or any combination thereof.

11. The tablet computer case of claim 9, wherein the components include at least one nonfunctional weight.

12. The tablet computer case of claim 9, wherein the components include a first member of a magnetic closure positioned to engage a second member of the magnetic closure located on the first panel.

13. The tablet computer case of claim 1, further comprising at least one spacer attached to the keyboard side of the second panel.

14. The tablet computer case of claim 13, comprising at least four spacers attached to the keyboard side of the second panel.

15. The tablet computer case of claim 13, wherein the spacer is configured to stably support the tablet computer case on a surface in a position where the keyboard side is facing down toward the surface.

16. The tablet computer case of claim 13, wherein the spacer has a thickness of from about 1/16 inch to about 1/2 inch.

17. The tablet computer case of claim 1, wherein a greatest thickness of the second panel is less than a greatest thickness of the first panel.

18. The tablet computer case of claim 17, wherein the greatest thickness of the second panel is from about 20% to about 80% of the greatest thickness of the first panel.

19. The tablet computer case of claim 17, wherein the greatest thickness of the second panel is from about 30% to about 50% of the greatest thickness of the first panel.

20. The tablet computer case of claim 17, wherein the greatest thickness of the second panel is from about 4.0 mm to about 10.0 cm.

21. The tablet computer case of claim 17, wherein the greatest thickness of the second panel is from about 5.0 mm to about 7.0 cm.

22. The tablet computer case of claim 1, wherein the communication connector is a wireless connector.

23. The tablet computer case of claim 1, wherein the hinge engages a bottom edge of the first panel and connects the first panel to a back edge of the second panel, and is configured to allow the first panel to swing over a range of about 360° relative to the second panel.

24. The tablet computer case of claim 23, wherein the hinge has a sufficient tension to hold the first panel and the second panel at substantially all positions of the first panel relative to the second panel within the range.

25. The tablet computer case of claim 1, wherein a weight of the first panel is substantially supported through the bottom edge of the first panel when the second panel rests on a surface and the bottom edge of the first panel is also in contact with the surface.

26. The tablet computer case of claim 1, wherein the angle is from about 90° to about 175°.

27. The tablet computer case of claim 1, wherein the hinge includes a foot for at least partially supporting the tablet computer case above an underlying surface.

28. The tablet computer case of claim 27, wherein the foot raises the second panel so that the keyboard rests at an angle relative to the underlying surface.

29. The tablet computer case of claim 28, wherein the bottom edge of the tablet panel rests in a same plane as the bottom of the foot and both the foot and the bottom edge of the tablet panel rest on the underlying surface, such that the underlying surface directly supports the weight of the first panel.

30. A method of making a tablet computer case with enhanced stability, comprising configuring a first panel to releasably engage and hold a tablet computer; and at least one side edge which engages an edge of the tablet computer, and a fascia that extends along a portion of a visual output side of the tablet computer and that is integral with the at least one side edge attaching the first panel through a hinge to a second panel having a keyboard, said second panel weighing substantially less than said first panel with the tablet computer held therein; and distributing a total weight of the second panel so as to minimize tipping of the tablet computer case when the first panel with the tablet computer engaged therein is placed at an obtuse angle with respect to the second panel; and configuring the hinge comprises a first rotational axis adjacent to a bottom edge of the first panel and a second rotational axis adjacent to a back edge of the second panel, and wherein the hinge is configured so that the bottom edge of the first panel can rest in substantially a same plane as an underside of the second panel and a portion of the hinge when the first panel is at an angle of at least about 90° with respect to the second panel.

31. The method of claim 30, comprising distributing the total weight of the second panel in a pattern that increases from a proximal third of the second panel toward a distal third of the second panel.

32. The method of claim 31, comprising placing from about 30% to about 95% of the total weight of the second panel in the distal third and a medial third.

* * * * *